United States Patent [19]

Croset

[11] 4,308,728
[45] Jan. 5, 1982

[54] TORSIONALLY RESILIENT COUPLING

[75] Inventor: Louis P. Croset, Huddersfield, England

[73] Assignee: Engineering Development (Leeds) Limited, England

[21] Appl. No.: 66,393

[22] Filed: Aug. 14, 1979

[51] Int. Cl.³ .............................................. F16D 3/17
[52] U.S. Cl. ................................ 64/11 R; 64/27 NM
[58] Field of Search .................... 64/11 R, 27 NM, 14, 64/9 A

[56] References Cited

U.S. PATENT DOCUMENTS

| 1,467,185 | 9/1923 | Meriam | 64/11 R |
| 2,564,826 | 8/1951 | Yoder | 64/11 R |
| 3,729,953 | 5/1973 | Wanzer | 64/14 |
| 3,977,212 | 8/1976 | Johansson | 64/11 R |

FOREIGN PATENT DOCUMENTS

| 850099 | 9/1952 | Fed. Rep. of Germany | 64/11 R |
| 1130458 | 9/1955 | France | 64/11 R |
| 575163 | 2/1946 | United Kingdom | 64/14 |
| 704497 | 2/1954 | United Kingdom | 64/11 R |
| 652382 | 3/1979 | U.S.S.R. | 64/14 |

Primary Examiner—Ira S. Lazarus
Assistant Examiner—Magdalen Moy
Attorney, Agent, or Firm—William E. Mouzavires

[57] ABSTRACT

This invention relates to an improved torsionally resilient coupling such as a flexible coupling, damper, gearwheel or the like connector of the type comprising two concentric members each provided with co-operating grooves to accommodate solid cylindrical blocks of resilient material such as rubber or synthetic rubber-like material of any required hardness between the concentric members for the purpose of transmitting torque and providing the desired degree of torsional deflection and stiffness for any particular application. In such an arrangement the block cavities formed by co-operating grooves in the outer and inner concentric members, are closed by end plates and have a central circular portion in contact with the cylindrical elastic block and developing at each end into tangential straight flanks of variable angularity which come into contact with the block only under torque load conditions, the blocks being subjected to radial deformation only as their length is equal to that of the cavity into which their diameter is a light driving fit.

4 Claims, 4 Drawing Figures

TORSIONALLY RESILIENT COUPLING

GENERAL DESCRIPTION

This invention concerns improvements in torsionally resilient couplings such as flexible couplings, dampers and like connectors which are torsionally resilient and can be used effectively as torsional vibration dampers, dynamic dampers (also known as detuners) and similar connections affording a degree of damping. More specifically the invention relates to such devices of the type comprising two concentric members each provided with co-operating grooves to accommodate solid cylindrical blocks of resilient material such as rubber or synthetic rubber-like material of any required hardness between the concentric members for the purpose of transmitting torque and providing the desired degree of torsional deflection and stiffness for any particular application (hereinafter referred to as the type described).

The object of this invention is to provide an improved construction to a coupling of the type described giving a wide range of stiffness and torque capacities by making the coupling in series of low, medium and high stiffnesses, each series having a different number of block cavities and one, two or three blocks per cavity, but using the same range of six standard block sizes, namely diameter and length, thus keeping the number and cost of the rubber block moulds to a minimum, reducing manufacturing time and offering a wider scope of application than hitherto available for any given size of coupling.

According to the present invention a coupling of the type described has the block cavities, formed by the cooperating grooves, closed by end-plates which prevent axial deformation of the blocks of resilient material at each end on loading, and the improvement consists of the grooves in each concentric member each having a central circular portion in contact with the solid cylindrical elastic block and two tangential straight flanks which come into contact with the block only under torque load conditions, the blocks being subjected only to radial deformation, as their length is equal to that of the cavity into which their diameter is a light driving fit. A radial working clearance between the outer and inner concentric members, and axial clearances between the inner member and the driving flange on its one side and the cover plate on its other side, are provided to accommodate any angular or parallel misalignment of the driving and driven shafts. Furthermore each end of each cylindrical block may have a 45 degrees chamfer or fillet greater than the axial clearance of the inner member, thereby to avoid extrusion of the blocks into the clearances under maximum deformation, the tangential straight groove flanks of the inner member being provided with a small radius to obviate or minimise indentation of the blocks under normal and shock loads deformation, in the case of the 30 degree flanks.

Six coupling series may be as follows: low stiffness with 6 and 9 blocks, medium stiffness with 12 and 18 blocks and high stiffness with 24 and 30 blocks, each series using the same range of standard blocks of say 1" to 6" or larger diameter and length or of an equivalent metric size if desired. Groove flanks subtending an angle of 30° provide a central circular portion of 120° block contact in each concentric member groove (180°−30°−30°=120°). To obtain a lower stiffness, that is, a greater torsional deflection, groove flanks subtending an angle of 45° would reduce the central circular portion to 90° of block contact (180°−45°−45°=90°), which doubles the total number of stiffness for each series, thus making a total of twelve stiffnesses for six series, and each series with one, two or three blocks per cavity gives 18 torque capacities (3×6) for each series, that is a total of 108 torque capacities for six series, the cylindrical blocks being subjected to combined compression and shear stresses in each case.

This means that for each coupling series, the 45° and 30° tangential groove flanks give a low and high stiffness coupling range respectively, that is to say, two distinct ranges of couplings. Thus for series six, wherein the pitch angle of the blocks is 60° the torsional deflections will be high, say 15° and 7.5° respectively, whilst for series 30 wherein the pitch angle of the blocks is 12° the torsional deflections will be low, say 3° and 1.5° respectively, for the two ranges of couplings.

Either of the concentric members can be the driving or the driven member as desired.

The invention may take the form of a gear-wheel or a damper, rather than a coupling per se.

The invention will now be further described by way of example with reference to the accompanying diagrammatic drawings wherein.

Figure 1:
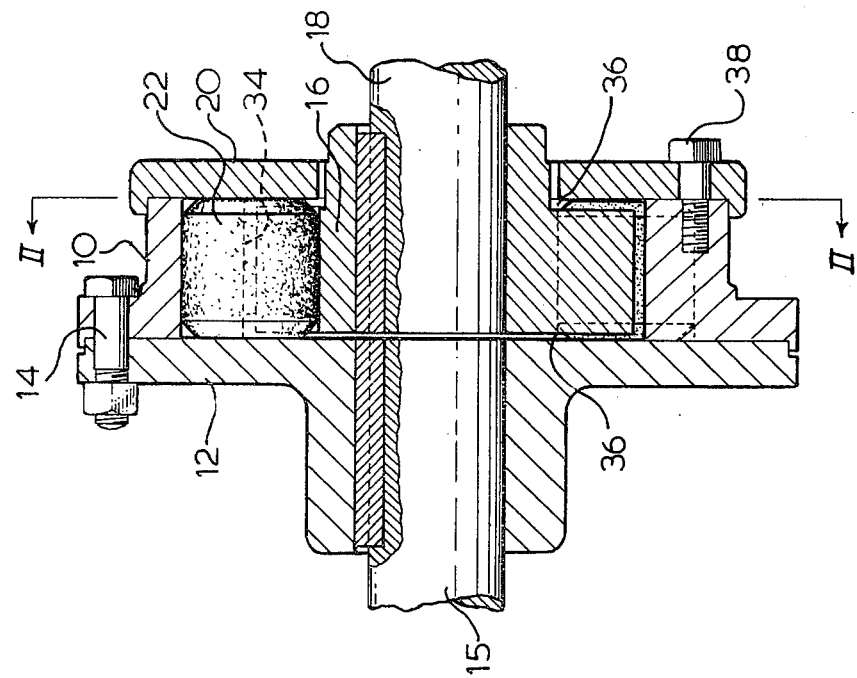
FIG. 1 is an angled longitudinal section through a coupling according to the invention taken along the line I—I of FIG. 2.
Figure 2:
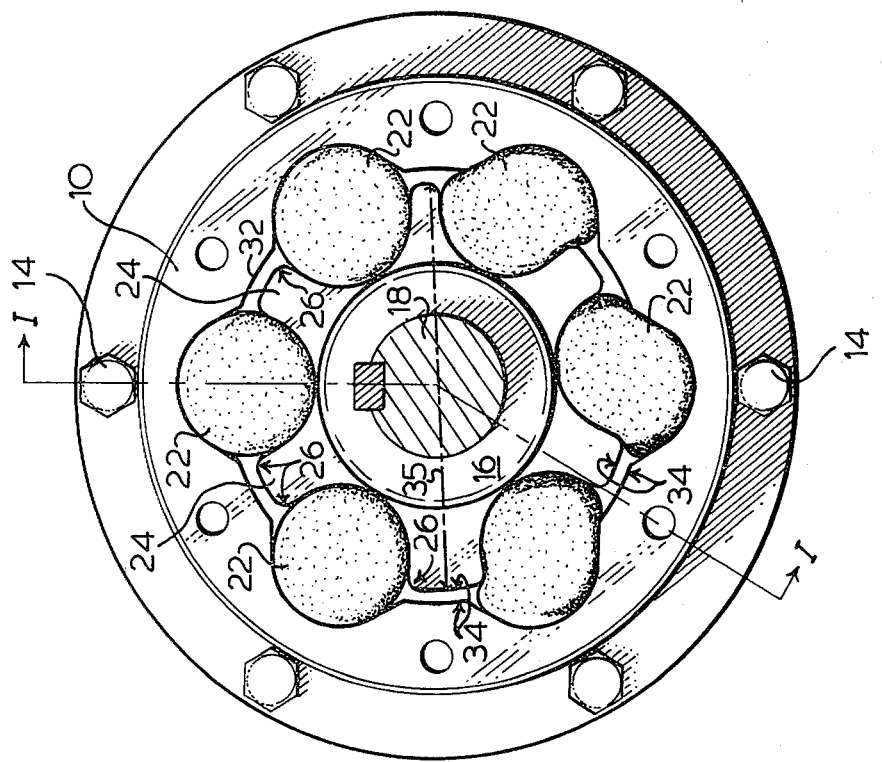
FIG. 2 is a transverse section through the coupling taken along the line II—II of FIG. 1, the upper half of the view showing the arrangement at rest, or in a condition in which no torque is being transmitted, whilst the lower half shows the concentric members relatively displaced and the transmission blocks deformed as torque is transmitted from one member to the other.

Referring to FIGS. 1 and 2 the outer concentric member 10 is bolted to a driving flange 12 which is mounted upon a driving shaft 15, whilst the inner concentric member 16 is mounted upon the driven shaft 18 and a cover plate 20 is bolted to the outer member 10, after insertion of solid cylindrical elastic blocks 22, sealing the cavities.

The arrangement of FIGS. 1 and 2 is a six-blocks series coupling, and the top half of FIG. 2 shows three blocks 22 as inserted in a coupling with 30° groove flanks whilst the bottom half shows three blocks subjected to maximum torque load deformation, the ends of the arms 24 of the inner member 16 being provided with small fillets 26 to prevent indentation of the blocks 22 when transmitting torque in either direction of rotation.

Figure 3:
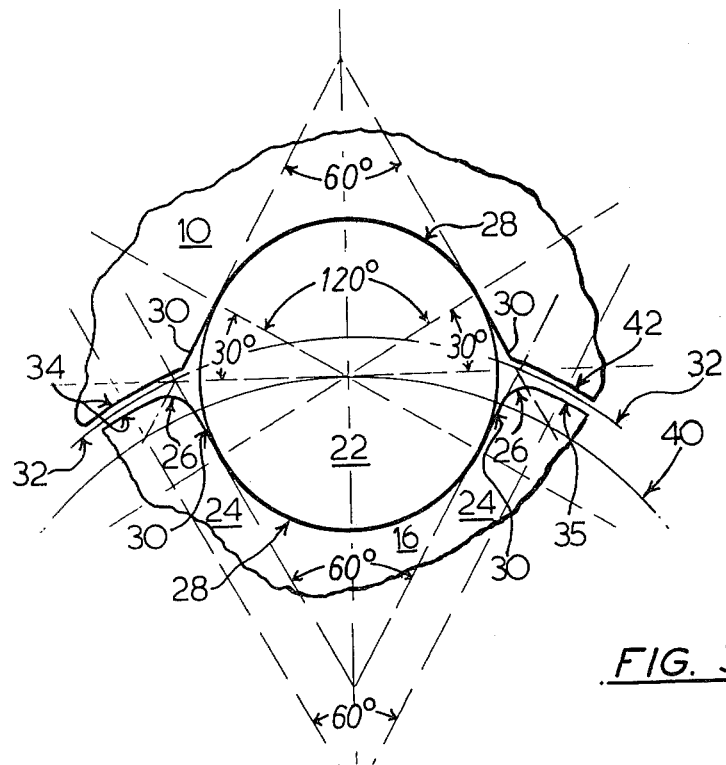
FIG. 3 is an enlarged detail of FIG. 2 showing the angle of 30° subtended by each of the tangential straight flanks at the ends of the central circular portion of each groove.
Figure 4:
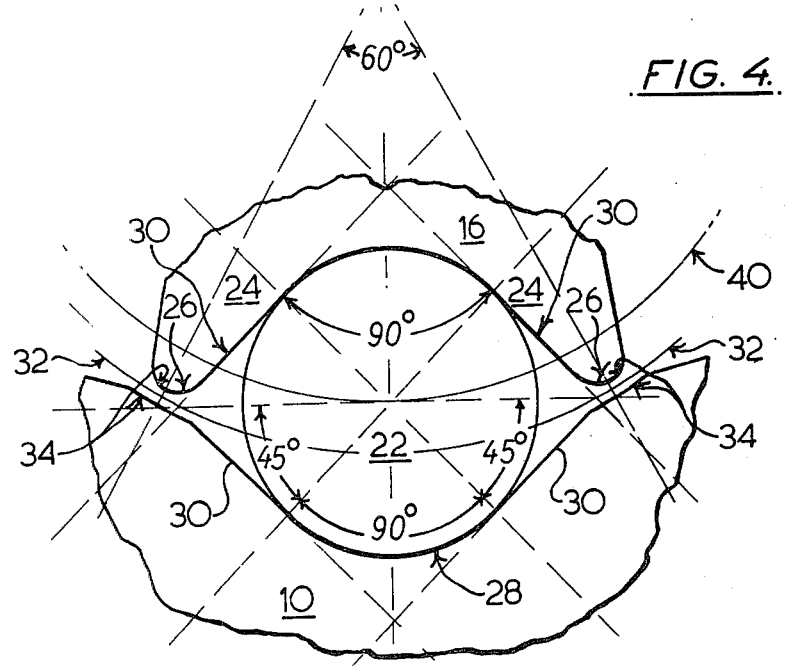
FIG. 4 is a detail similar to FIG. 3 showing an alternative construction in which an angle of 45° is subtended by the tangential straight flanks, in each of the concentric members.

Referring to FIG. 3 which is an enlarged detail of FIG. 2 it will be seen that the circular portion 28 of the block cavities formed in both members 10 and 16 develops at each end into a tangential straight flank 30. The clearance between members 10 and 16 resulting from the straight flanks determines the degree of torsional deflection which is a minimum for 30 degree flanks and a maximum for 45 degree flanks as shown in FIG. 4, the said torsional deflections being greatest for "series 6" wherein the pitch angle of the block cavities is 60 degrees and lowest for "series 30" wherein the pitch angle of the block cavities is 12 degrees, as explained hereinbefore.

In order to provide straight flanks of equal length in both the outer 10 and the inner 16 members of the coupling, the junction of the groove flanks 30 determines the nominal bore and diameter 32 of the outer and inner concentric members 10 and 16 respectively, the said nominal bore and diameter being respectively increased and reduced by the same amount in order to provide a working clearance 34 between the concentric members to accommodate any parallel or angular misalignment of the driving and driven shafts. The clearance will be a minimum for the small diameter coupling series and a maximum for the large diameter coupling series, and it will be realised that intermediate groove flank angles of say 35 or 40 degrees could be provided to meet the required torsional deflection and stiffness of any particular application. The bore 42 of the outer member 10 and the diameter 35 of the inner member 16 are both slightly greater than the pitch circle diameter 40 of the solid blocks 22.

The inner concentric member 16 has axial clearances 36 with the driving flange 12 and the cover plate 20 and the ends of the blocks 22 have a 45 degree chamfer or fillet twice as big as the clearance 36 to avoid extrusion of the block material into the clearances under maximum deformation. The outer member 10 is secured to the driving flange 12 by bolts 14 and the cover plate 20 is secured to the outer member 10 by the set screws 38.

I claim:

1. In a torsionally resilient coupling comprising two concentric members each exhibiting co-operating grooves forming block cavities, a plurality of solid cylindrical blocks of resilient material accommodated within said cavities for transmitting torsional forces applied to one of said concentric members to the other concentric member, and end plates defining the axial extent of said cavities and preventing axial deformation of said blocks of resilient material at each end on loading thereof; the improvement wherein each of said grooves is defined by a central section which extends along an arc of a circle and whose entire surface is in contact at all times with the associated solid cylindrical block of resilient material, said central section developing at each end thereof into a straight flank extending tangentially relative to said circle and at an angle to a diametrical plane of said circle, said blocks each having a diameter dimensioned such that said blocks contact said flanks only under torque load conditions, said blocks being subjected only to radial deformation under said torque conditions due to being equal in length to that of the cavity into which their diameter is a light driving fit, and wherein said angle of each said tangential flank is such as to provide the desired torsional deflection and coupling stiffness, a relatively small angle providing a low torsional deflection and high stiffness, and a larger angle providing a higher torsional deflection and lower stiffness.

2. A torsionally resilient coupling, in accordance with claim 1 wherein said tangential flanks subtend angles of 30° and are a development of a 120° circular portion of block contact groove.

3. A torsionally resilient coupling in accordance with claim 1 wherein said tangential flanks subtend angles of 45° and are a development of a 90° circular portion of block contact groove.

4. A torsionally resilient coupling in accordance with claim 1, comprising a driving flange and a co-operating cover plate associated with one of said concentric members, and wherein all said cylindrical blocks constitute driving elements irrespective of direction of rotation of the said concentric members, and upon assembly each have a central circular contact with the grooves in each said concentric member, and their ends are also in contact respectively with said driving flange and said cover plate and are thereby restricted axially and hence subjected only to radial deformation under torque and shock load conditions.

* * * * *